United States Patent [19]

Anderson

[11] Patent Number: 4,683,364
[45] Date of Patent: Jul. 28, 1987

[54] ELECTRICAL DISCHARGE SHAPE FORMING AND SURFACE CONDITIONING DEVICE

[75] Inventor: Alex L. Anderson, Rockford, Ill.

[73] Assignee: Micro Surface Technology, Inc., Rockford, Ill.

[21] Appl. No.: 785,145

[22] Filed: Oct. 7, 1985

[51] Int. Cl.[4] .......................... B23H 1/04; B23H 7/26
[52] U.S. Cl. .................................... 219/69 R; 219/696
[58] Field of Search ................. 219/69 E, 69 V, 69 R, 219/69 M

[56] References Cited

U.S. PATENT DOCUMENTS

| | | | |
|---|---|---|---|
| 2,719,902 | 10/1955 | Flynn | 219/69 E |
| 2,739,935 | 3/1956 | Kehl et al. | 219/69 E |
| 3,433,727 | 3/1969 | Keeleriz | 219/69 E |
| 3,800,117 | 3/1974 | Anderson | 219/69 E |
| 4,242,557 | 12/1980 | Sato et al. | 219/69 E |
| 4,471,199 | 9/1984 | Michishita et al. | 219/69 E |

FOREIGN PATENT DOCUMENTS

| | | | |
|---|---|---|---|
| 54-25594 | 2/1979 | Japan | 219/69 E |
| 342304 | 12/1959 | Switzerland | 219/69 V |
| 1526485 | 9/1978 | United Kingdom | 219/69 E |

*Primary Examiner*—A. D. Pellinen
*Assistant Examiner*—Geoffrey S. Evans
*Attorney, Agent, or Firm*—Allegretti, Newitt, Witcoff & McAndrews, Ltd.

[57] ABSTRACT

An electric discharge surface conditioning apparatus includes a discharge electrode consisting of an assembly of alternating conductive and non-conductive discs which rotate about an axis. The surface of the conductive discs includes a specific pattern of slots to effect a pumping action thereby enhancing the electric discharge efficiency by circulating the fluid away from the surface of the workpiece being machined. A control arrangement for controlling the orientation of the described electrode is provided.

8 Claims, 11 Drawing Figures

ELECTRICAL DISCHARGE SHAPE FORMING AND SURFACE CONDITIONING DEVICE

REFERENCE TO RELATED APPLICATION

This is a continuation-in-part of application Ser. No. 601,719, filed Apr. 18, 1984 (Attorney Case No. 83,868), now U.S. Pat. No. 4,553,012.

BACKGROUND OF THE INVENTION

This invention relates to apparatus for electric discharge machining of the surface of a work roll and, more particularly, to a new electrode construction and electrode mounting arrangement for such apparatus.

The use of a satin or matte finished roll for cold rolling of steel sheet or strip in order to texture the surface of the finished product has been a practice in the steel industry for some time. One patent that discloses this practice and teaches a method for providing such a finish is Bills, et al, U.S. Pat. No. 3,754,873 issued Aug. 28, 1973 for a Cold Rolled Sheet. The Bills et al patent teaches that in order to effect a sanitized or textured surface on sheet or strip material, the rolls for processing the sheet or strip are textured. Texturing of the rolls is generally effected by electric discharge machining methods. Since the issuance of U.S. Pat. No. 3,754,873, there has been a series of patents relating to electrical discharge machining of steel cold forming rolls including the following patents:

| Reg. No. | Inventor | Title | Issue Date |
|---|---|---|---|
| 3,796,851 | Pfaff, Jr. | Apparatus for Making Cylindrical Dies | 3/12/74 |
| 3,800,117 | Anderson | EDM Apparatus for Finishing Rolls | 3/26/74 |
| Re. 28,027 | Bills, et al | Cold Rolling Work Roll | 6/4/74 |
| 3,878,353 | Anderson | Method for Finishing Rolls | 4/15/75 |
| 3,890,481 | Buck | Electroerosive Process for Manufacturing Rotary Dies | 6/17/75 |
| 3,941,970 | Grow | Feed Roll and Method of Imparting A Rough Texture to the Surface Thereof | 3/2/76 |
| 3,962,557 | Buck | Waste Metal Removal in E. D. M. Machining | 6/8/76 |
| Re. 29,399 | Inoue | Servosystem for Gap Electrical Machining Processes (Especially Electroerosion) | 9/13/77 |
| 4,219,718 | Sato, et al | Process and Apparatus for Electrical Discharge Machining of Cylindrical Work | 8/26/80 |
| 4,221,952 | Sato, et al | Electric Discharge Machining Method | 9/9/80 |
| 4,233,485 | Sato, et al | Process for Electrical Discharge Machining of Cylindrical Work | 11/11/80 |
| 4,242,557 | Sato, et al | Apparatus for Electrical Discharge Machining of Cylindrical Work | 12/30/80 |
| 4,287,403 | Sato, et al | Method and apparatus for Adjusting the Gap in an Electric Discharge Machine | 9/1/81 |

It will be noted that among the patents listed, are two U.S. Pat. No. 3,800,117 and U.S. Pat. No. 3,878,353, issued in the name of the present inventor. These patents disclose that rolls may be machined by electric discharge methods that call for mounting the roll partially submerged in a reservoir of dielectric fluid in opposed relation to a discharge electrode. The other prior art patents teach various electrode constructions, as well as various control circuitry for the electric discharge machining apparatus. Also, the various patents listed are not necessarily directed to methods for the manufacture of cold forming rolls, but, in fact, are directed to the general practice of electrical discharge machining apparatus and control equipment for such apparatus.

The present invention is particularly directed to electric discharge machining of rolls which would be used in the manufacture of sheet and strip and especially the apparatus for texturizing or for sanitizing such rolls. The invention has application, however, to texturizing a long shaft such as a temper mill work roll, a short shaft such as a crankshaft, a wear surface such as a cylinder opening, and a flat surface such as a machine slide surface.

Prior art apparatus and procedures, though successful and useful, are perceived to have some shortcomings. For example, control of the uniformity of the texture or pattern applied to the surface of the roll, particularly a roll which has a curved surface, has been difficult. Control of the machining operation itself by controlling the strength, duration and location of the electric discharge pulses has also been difficult. The present invention provides an apparatus which enhances the ability to control the electric discharge to a surface, particularly a surface having a simple curved or compound curved shape.

SUMMARY OF THE INVENTION

Briefly, the present invention comprises an apparatus for electric discharge machining of the surface of a roll where that roll is of a type which is mounted for rotation about a longitudinal axis above or partially submerged in a reservoir of dielectric fluid. The roll is positioned for cooperation with an electrode that moves over the surface of the rotating roll. As the electrode provides an electric discharge to the roll, the condition of the surface of the roll is altered. In one form, the electrode has a cylindrical shape and is constructed from a series of alternating wafers or discs of conductive and non-conductive material arranged as a composite stack. As the roll is rotated, so too is the cylindrical electrode. Dielectric fluid is directed into the gap between the roll form and the cylinder to flush the surface of the roll form as it is being machined by the electrode.

The roll form is mounted on a unique pair of bearing pads and is rotated by a flexible belt drive. The electrode is mounted so that it may move over the surface of the roll generally parallel to the longitudinal axis of the roll and in this manner may be exposed to the total surface of the roll as the roll is rotated about its longitudinal axis. Control circuitry is provided for controlling the spacing and the orientation of the electrode surface relative to the surface of the roll. Control circuitry may also be provided to control electric discharge from the electrode to the roll.

The control means provided for controlling the gap or space between the roll and electrode provide control for maintaining that gap or space a defined distance or a programmable distance. The control means for controlling the magnitude of the gap or space also includes means to account for wear of the electrode during the machining operation.

Thus, it is an object of the present invention to provide an improved, electric discharge, machining apparatus.

Still a further object of the present invention is to provide an improved, electric discharge, machining device which includes a control mechanism for controlling electric discharge from a cylindrical discharge electrode.

Another object of the invention is to provide an electric discharge apparatus having an electric discharge electrode in opposed relation to a workpiece or roll which is being machined wherein the electrode is cylindrical and is controlled in such a manner as to keep it in properly opposed relationship to the workpiece over the total surface of the workpiece as the electrode transverses that surface. The invention has application with a long, generally cylindrical shaft, a short generally cylindrical shaft, generally cylindrical openings, and a flat or slightly curved surface.

Still another object of the invention is to provide an improved and simplified electric discharge machining apparatus which provides enhanced control of the electrode discharge machining operation.

Yet a further object of the invention is to provide an improved electrical discharge machining apparatus wherein the gap between the discharge electrode and the workpiece may be precisely maintained and adjusted by improved control means.

Another object of the invention is to provide an electrical discharge machining apparatus having improved means for rotatably supporting a roll form.

These and other objects, advantages and features of the invention will be set forth in the detailed description which follows.

BRIEF DESCRIPTION OF THE DRAWING

In the detailed description which follows, references will be made to the drawing comprised of the following figures.

DESCRIPTION OF THE PREFERRED EMBODIMENT

In the following description, attention will be directed to the specific construction of the discharge electrode associated with the electric discharge machining apparatus as well as the means for mounting that discharge electrode and for controlling electric discharge from that electrode. The remainder of the assembly will be clear to those skilled in the art inasmuch as such equipment is available and is taught in many of the prior art references as disclosed above.

Figure 1:
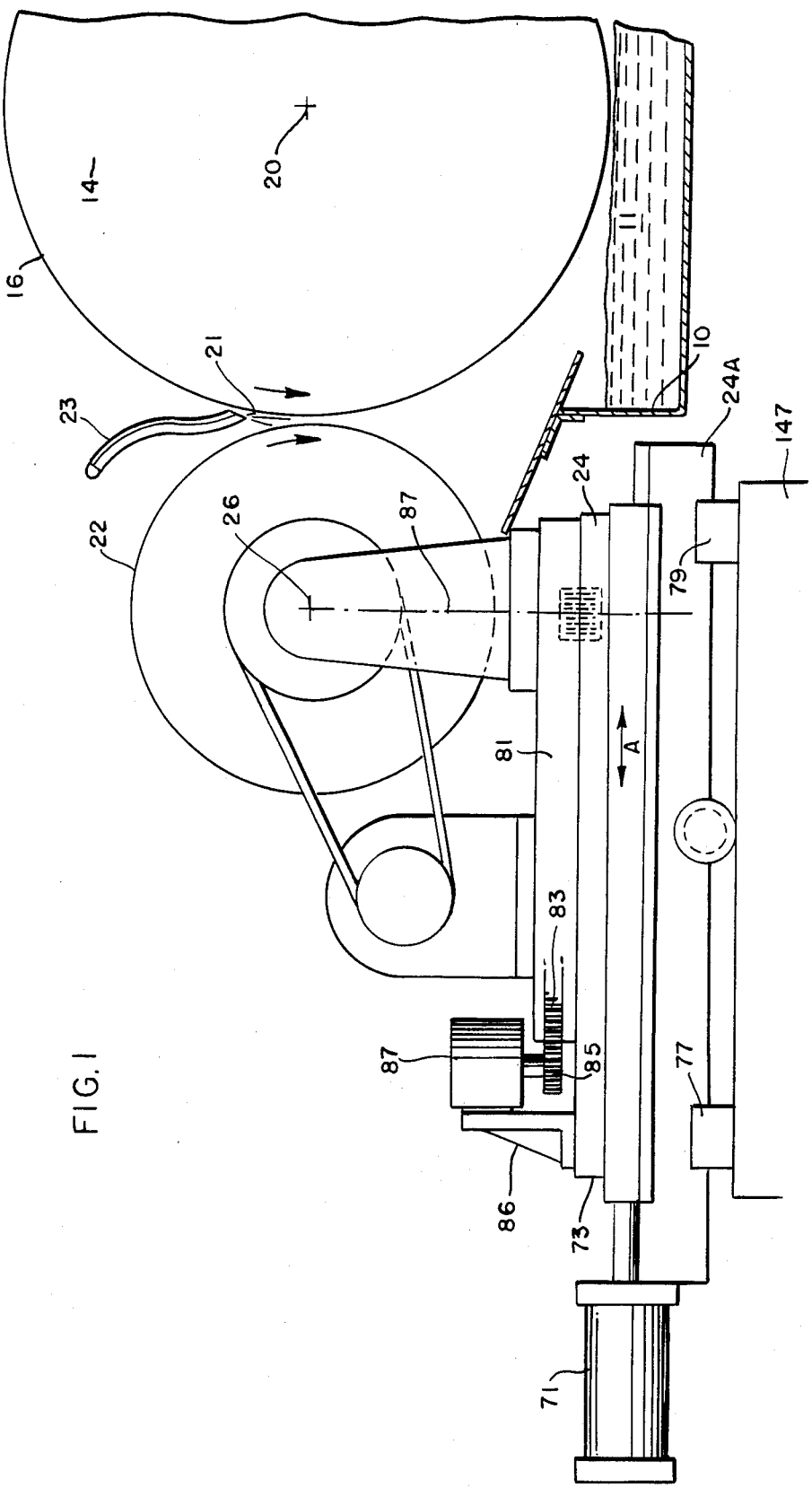
FIG. 1 is a diagrammatic elevation of the apparatus.
Figure 2:
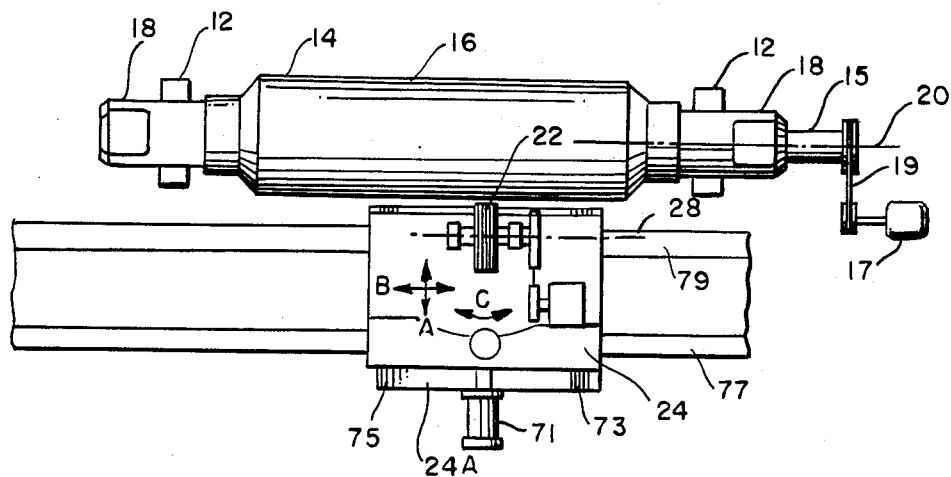
FIG. 2 is a plan view of the improved apparatus of FIG. 1.

Thus, FIGS. 1 and 2 depict in a schematic view the total apparatus of the present invention. The apparatus includes a reservoir or tank 10 in which a dielectric fluid 11 is provided as known to those skilled in the art. Mounted for rotation on appropriate support mechanisms 12 is a roll 14 having a shaped surface 16 which is to be textured. The roll 14 includes journals 18 which ride on the support mechanisms 12. During the machining operation, the roll 14 is connected via shaft 15 to a drive, such as a belt drive 19 driven by motor 17, so as to rotate the roll 14 at a desired speed and in a desired direction about a longitudinal axis 20 associated with the roll 14. The roll 14 may be supported slightly above the reservoir 10 and fluid 11 or immersed in fluid 11.

Arranged in opposed relation to the roll 14 is an electrode 22 from which current is discharged, A dielectric fluid stream 21 from tube 23 flows at roll 14 in the region of dielectric discharge. Current is directed from electrode 22 to the surface 16 of the roll 14 in order to effectively machine and thus form or cut the surface 16 in a desired matte or satin pattern or other pattern. The electrode 22 is mounted physically on a mounting assembly of three platforms 24, 24A, 81 which provide three degrees of controlled freedom. The electrode 22 may thus move toward and away from the surface 16 (direction A). It may move in a direction (direction B) generally parallel to the axis 20 of the roll 14. It may pivot (direction C) about a vertical axis through a point such as centerpoint 26 associated with the electrode 22. Centerpoint 26 lies on a vertical line which extends upward through the rotation axis 28 of the generally cylindrical electrode 22. Thus the point 26 lies on a line which is equidistant from the opposite faces of the cylindrical electrode 22.

Figure 3:
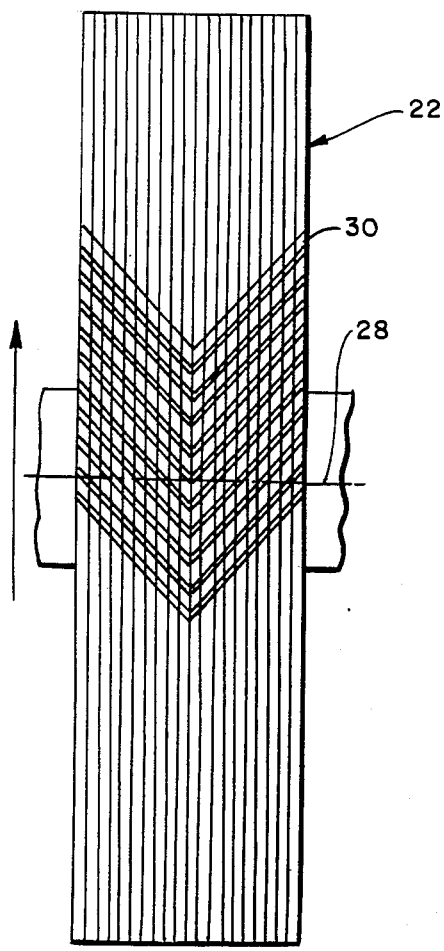
FIG. 3 is an enlarged plan view of the cylindrical electrode shown in FIG. 2.
Figure 4:
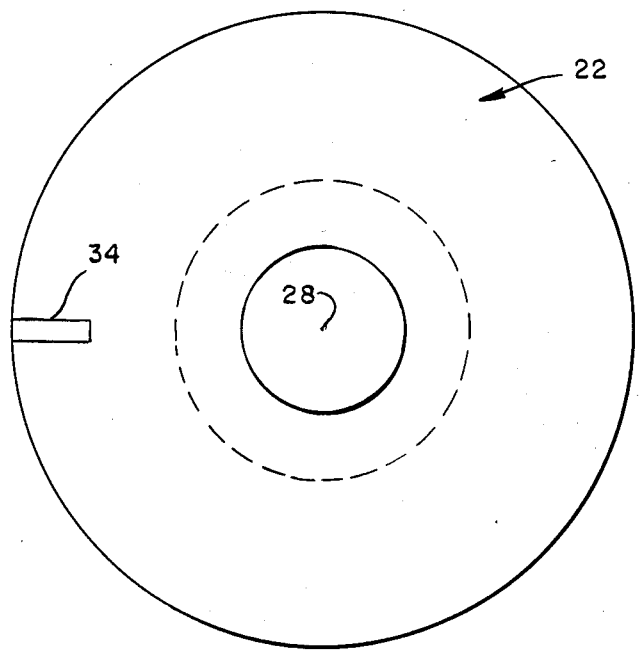
FIG. 4 is a cross sectional view of the electrode of FIG. 2.
Figure 5:
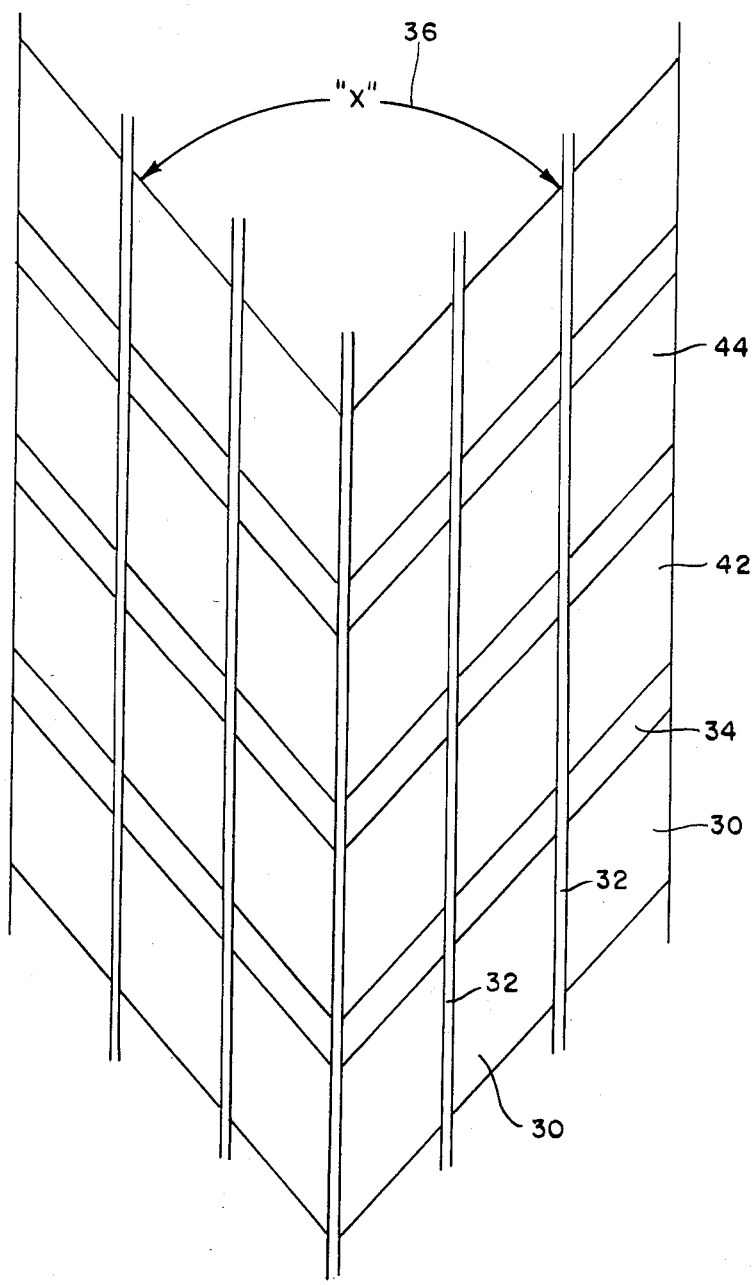
FIG. 5 is an enlarged plan view of the electrode surface associated with the apparatus of the invention.
Figure 6:
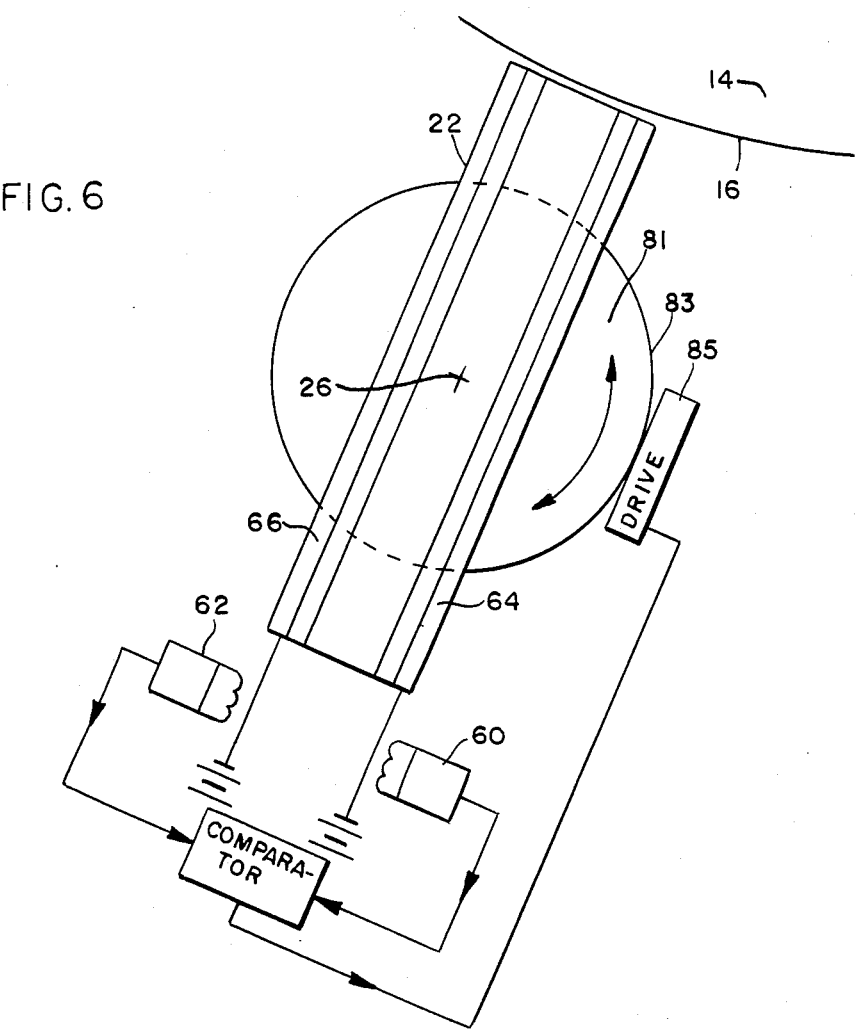
FIG. 6 is a schematic plan view of the improved apparatus of the present invention illustrating a mounting and control assembly associated with the discharge electrode.
Figure 7:
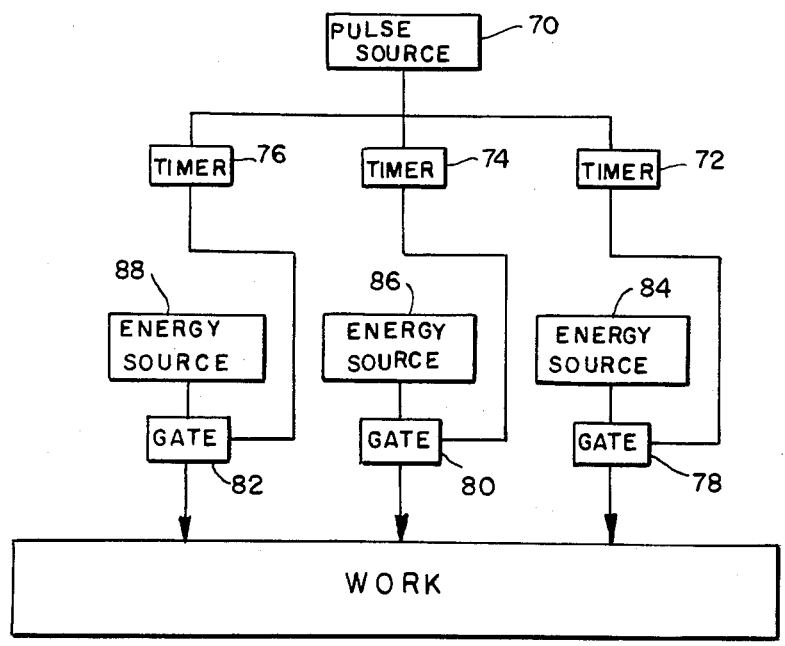
FIG. 7 is an electrical schematic for the electric discharge control of the electrode for the apparatus of the present invention.

FIGS. 3, 4, and 5 illustrate in greater detail the construction of the electrode 22. FIGS. 6 and 7 illustrate in further detail the features associated with the construction and control of the electrode 22 and its mounting assembly 24. Referring therefore first to FIG. 3, it will be seen that the electrode 22 is generally cylindrical in shape. It is comprised of a series of alternating conductive and non-conductive discs 30, 32 respectively. The discs 30, 32 are arranged in a compact cylinder which is rotatable about axis 28. The non-conductive discs 32 extend toward the outer periphery of the cylinder and insulate the conductive discs 30 from each other. The conductive discs 30 include slots 34 which define a V-shaped or herringbone pattern in the array of conductive discs 30. The pint of the V may be substantially at the transverse center plane of the cylnder 22 as shown in FIG. 3 and is directed opposite to the direction of rotation of the cylinder 22 about the axis 28 during electrode operation. The opening angle 36 in FIG. 5 defined by the opposite sides of the V defined by the slots 34 is preferably less than 180°. Preferably the slots 34 are spaced about the outer periphery of each of the conductive discs 30 in a uniform manner although slots 34 may be varied in configuration, depth, and array on the outer surface of the cylinder 22. Each of the conductive discs 30 is preferably separately connected to an electrically conductive ring that connects with a power source that provides electric energy.

In operation, the electrode 22 is driven about axis 28. As the electrode 22 rotates, the channels formed by the slots 34 tend to provide a pumping action which moves the dielectric fluid away from the surface 16 particularly adjacent the gap between the electrode 22 and the roll 14. Thus material which is machined by the electric discharge from the conductive discs 30 is quickly and easily transported away from the surface 16 to thereby improve the efficiency of the apparatus.

The angled slot 34 in the discs 30 insures that at least a portion of the conductive surface of each separate disc 30 is always in opposed relation to the workpiece 14. That is, a non-slotted part of the outside surface of the disc 30 between successive slots 34 will always be adjacent the surface 16 of the roll 14. For example, a part of region 42 will be opposed to the surface 16 of the roll 14 or a part of region 44 will be in opposed relation to surface 16 at all times along a line of closest approach between the cylinder 22 and roll 14. At no time will a slot 34 alone be totally opposed to surface 16 because the slot 34 is angled.

In practice, the conductive discs 30 are made from a conductive material such as brass, copper or graphite. The non-conductive discs 32 may be made from an insulating maerial such as Bakelite material or another insulating material. Further, it is preferred that the non-conductive discs 32 are maintained as thin as possible in order to avoid formation of gaps on the surface of the item being machined.

FIG. 6 illustrates schematically one manner by which the rotating cylinder or electrode 22 is maintained in an opposed relation to the form or work roll 14. A preferred orientation of the electrode 22 relative to the roll 14 is to maintain the rotation axis of the electrode 22 in position generally parallel to the rotation axis 20 of roll 14, it being understood that the roll 14 will have, in all likelihood, a crown or a curved or compound curved shape. Thus, the axis 28 will be nearly parallel to axis 20, but slightly skewed to maintain proper alignment of electrode 22 relative to surface 16 particularly in the instance of a crowned roll.

To provide such alignment, sensors 60, 62 are associated respectively through an electric circuit with the outside conductive discs 64, 66 of the electrode 22. The voltage drop between the roll 14 and associated with the respective discs 64, 66 is sensed, compared and utilized to provide a control signal to pivot the platform 81 which supports the electrode 22 and to thereby maintain the surface of that electrode 22 generally parallel to the surface 16 of the roll 14 as depicted. Thus, the assembly of platform 81 is pivoted or driven to position the electrode 22 so as to equalize the voltage drop between roll 14 and both discs 64, 66. The specific circuitry and sensing mechanism to accomplish this will be recognized by those skilled in the art.

A first specific mounting arrangement is described as follows and is depicted in FIGS. 1 and 2: there are three independent motions which may be imparted to the assembly of platforms 24, 24A, 81. The first motion in direction A indicated in FIG. 1 is accomplished by means of a servo controlled hydraulic cylinder 71 which moves the platform 24 along guide rails 73, 75 toward and away from the roll 14.

The second motion in direction B which is generally parallel to the axis 20 is accomplished by movement of the platform 24A on parallel guiderails 77, 79 which are cooperative with a nut and screw mechanism attached to the bottom of the platform 24A.

The third direction of motion of the electrode 22, namely the direction indicated as direction C in FIG. 2 and which was previously described with respect to FIG. 6, is accomplished by a servo controlled rack and pinion as depicted in FIGS. 1 and 2. Specifically, an electrode platform 81 is mounted for rotation about the vertical axis through point 26 on the platform 24. The platform 81 includes a circumferential rack or gear 83 cooperative with a pinion 85 driven by a servomotor 87. The servomotor 87 may be controlled in accordance with the description previously given with respect to FIG. 6.

FIG. 7 illustrates a further feature of the invention; namely, a circuit which will sequence current pulses to the conductive discs 30. Specifically, a pulse control source 70 sends a signal simultaneously to various timers 72, 74, 76 associated respectively with separate conductive discs 30. The individual timers 72, 74, 76 delay, by a predetermined amount, the operation of associated gates 78, 80, 82 to control current flow from an energy source associated respectively therewith 84, 86, 88. It is possible with such an arrangement that each of the separate conductive discs 30, which are arranged in side by side, separate array, may be sequenced so that, for example, adjacent discs 30 sequentially receive current pulses. The particular sequencing and selection of the sequence of pulsing may be adjusted to vary the electric machining pattern by controlling the timer 72, 74, 76 settings.

Figure 8:
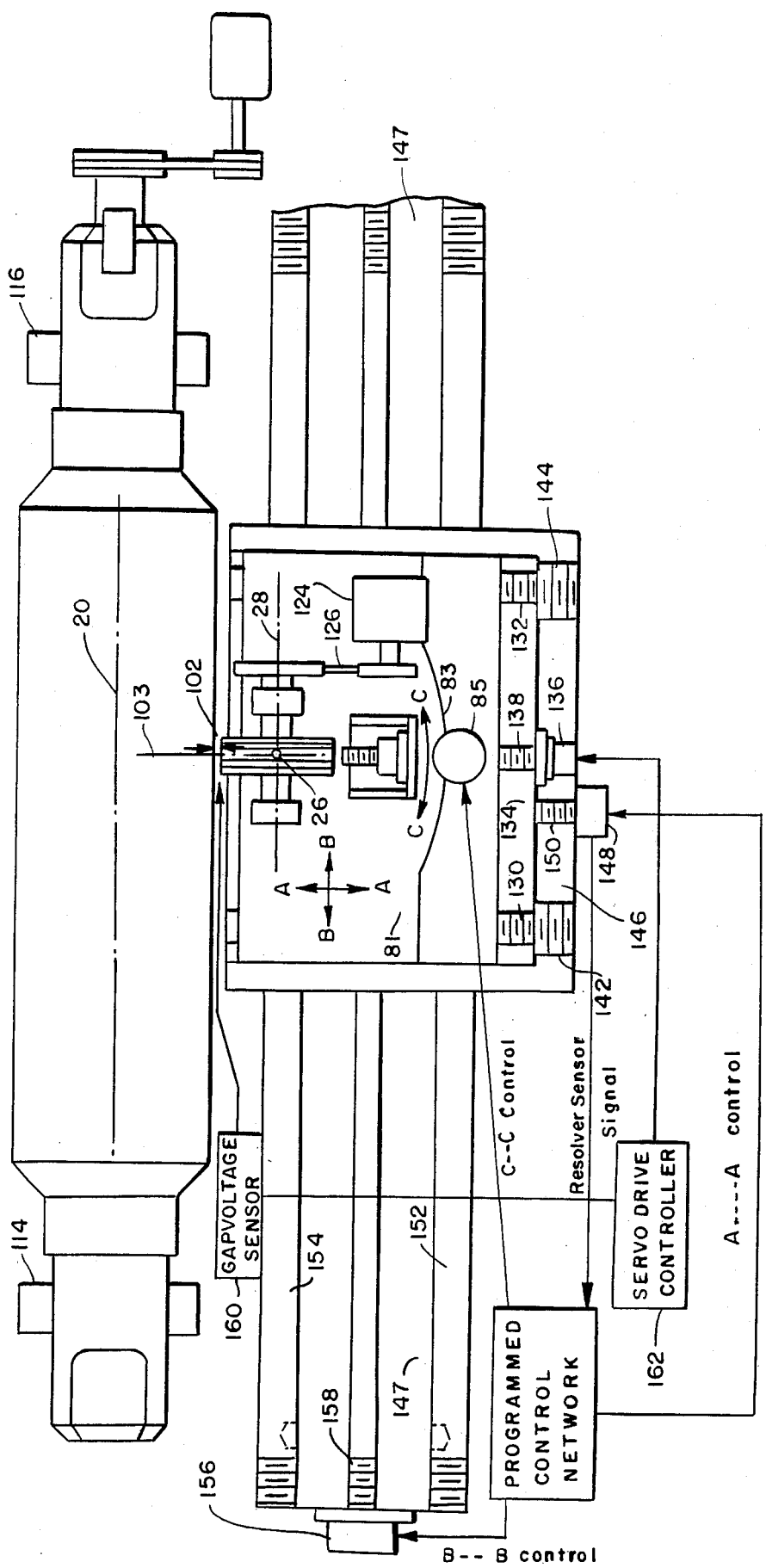
FIG. 8 is a top plan view of an alternative mounting and control assembly associated with the discharge electrode.
Figure 9:
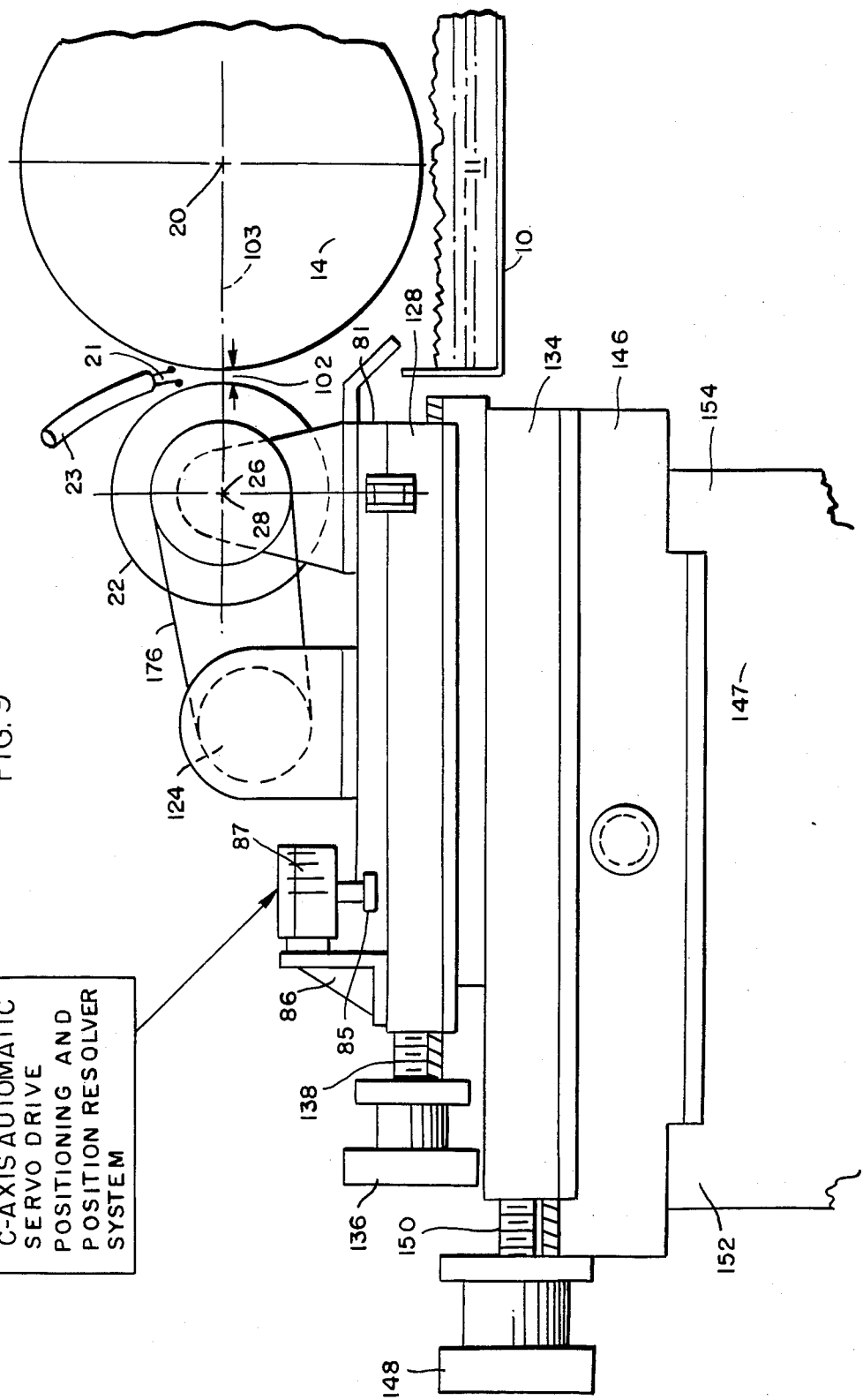
FIG. 9 is a side view of the mounting and control assembly of FIG. 8.
Figure 10:
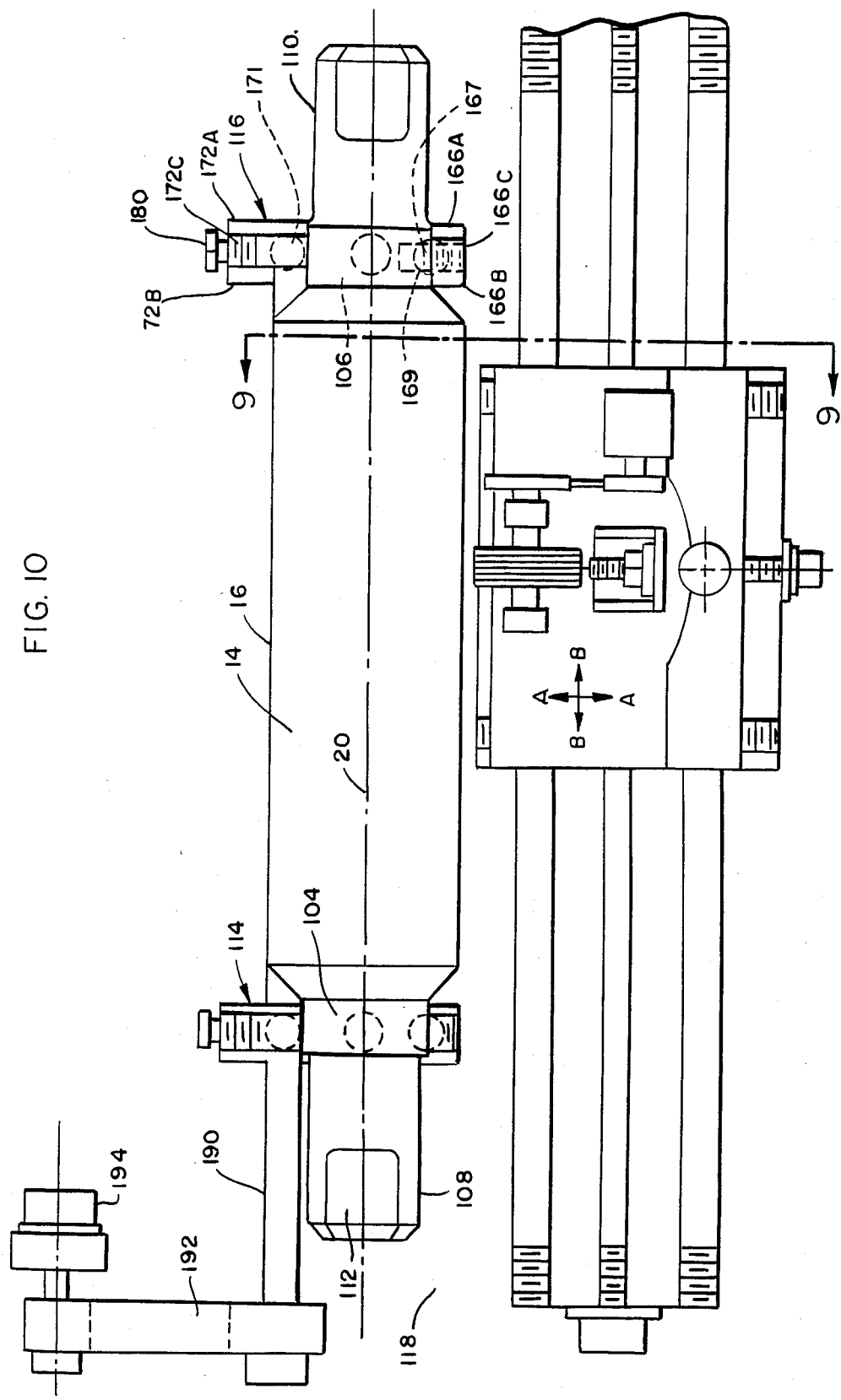
FIG. 10 is a plan view of an alternative roll support structure.
Figure 11:
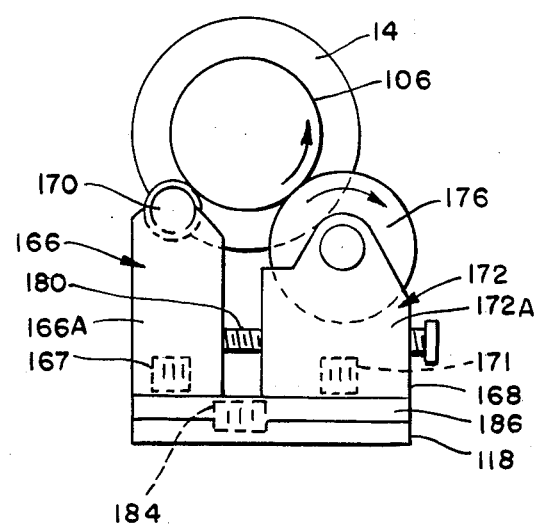
FIG. 11 is a side view of the roll support structure of FIG. 10.

FIGS. 8-9 ilustrate an alternative mounting assembly for the electrode 22 and FIGS. 10-11 illustrate an alternative roll support. With respect to FIGS. 8-11, like numbers are used for like parts as with prior FIGS. 1-7.

Referring first to FIGS. 8 and 9, an alternative mounting platform assembly is disclosed along with control means to control the cutting or machining performed by the cylinder electrode 22 on the workpiece roll 14. Machining by utilization of the effect of electric discharge at a given current is dependent upon the voltage differential between the electrode 22 and the surface 16 of roll 14 for a given period of time at each point on the surface 16. This is, in turn, dependent upon the magnitude of a gap 102 between electrode 22 and roll 14 and the time period which the electrode 22 dwells opposed to each point on surface 16. Gap 102 is defined as the distance between the cylinder 22 and the workpiece surface 16 along a line 103 drawn between axis 28 and axis 20, generally perpendicular to both the axis 28 and axis 20, and passing through the midpoint 26 of electrode 22. Gap 102 is defined as a first gap 102.

Control of the gap 102 as well as the dwell time of electrode 22 at each point on surface 16 is effected by controlling the position and duration at each position of electrode 22 with respect to directions A—A, B—B, and C—C previously described. The structure of FIGS. 8-9 for control in directions A—A, B—B and C—C is similar to that set forth in FIGS. 1 and 2 and previously described except for the utilization of additional mechanism to control in the A—A direction. Thus, movement in the A—A direction is controlled in two steps, $A_1$—$A_1$ and $A_2$—$A_2$ described in greater detail below.

Electrode 22 is mounted on platform 81 along with a motor 124. Motor 124 drives a belt 126 which rotates the electrode 22 about its rotation axis 28. The electrode platform 81 is pivotally mounted on a second platform 128 so that the electrode platform 81 will pivot about a vertical axis 187 through point 26. The vertical axis extends vertically through the center of the electrode 22. Pivotal motion is imparted to the patform 81 by cooperation of a rack 83 defined in the edge of pivotal platform 81 with a pinion 85 attached by a bracket 86 to platform 128. Thus, platform 81 may be pivoted about its mounting axis 187 to the platform 128 and provide movement of the electrode 22 in the direction C—C illustrated in FIG. 8.

The platform 128 is mounted on parallel tracks 130 and 132. The tracks 130 and 132 are situated on a second platform 134 and extend generally transverse to the roll 14. The platform 128 is thus movable in the axial direction $A_2$—$A_2$ depicted in FIG. 8 by movement along the tracks 130 and 132 on second platform 134. Movement of platform 128 on the tracks 130 and 132 is precisely controlled in response to actuation of a servomotor 136 mounted on the second platform 134 which operates a screw drive 138 for platform 128.

Platform 134 is, in turn, mounted for movement in tracks 142 and 144 in direction $A_1$—$A_1$. The tracks 142 and 144 are parallel to tracks 130 and 132 and are mounted on third platform 146. Thus, it is possible to move the platform 128 as well as the platform 134 in the same axial direction A—A depicted in FIG. 8. In other words, movement in the axial direction A—A may be accomplished by movement of platform 128 (i.e. $A_2$—$A_2$) or alternatively movement of the platform 134 ($A_1$—$A_1$). Movement of platform 134 is precisely controlled in response to operation of a servomotor 148 attached to platform 146 and operating a screw drive 150 for platform 134.

Finally, platform 146 is movable in a direction transverse to the movement of platform 134 along tracks 152 and 154 on support stand 147 in the direction B—B. Movement of platform 146 is precisely controlled in response to servomotor 156 attached to the table 118 and which operates a screw drive 158 for platform 146.

As can be seen by reference to FIG. 8, it is possible to have three independent degrees of movement of the various platforms to effect commensurate movement of the electrode 22. In review, the electrode 22 may be moved in a first direction A—A by movement of platforms 128, 134, in a second direction transverse to the first direction, namely, B—B by movement of platform 146, and in a pivotal sense about the point 26 and axis 187 in a direction C—C by movement of platform 81. Movement in the A—A direction is broken down into two steps; namely, a first step associated with movement of platform 128 ($A_2$—$A_2$) and a second step ($A_1$—$A_1$) associated with movement of the platform 134.

The movement of the platform 128 (direction $A_2$—$A_2$) in the embodiment depicted is controlled in response to measurement of the magnitude of the first gap 102. Thus, voltage drop associated with the electric discharge from the electrode 22 to the roll 14 provides an indication of the magnitude of the first gap 102. This signal is sensed by a gap voltage sensor 160. The gap voltage sensor 160 then provides a signal to a comparator and servodrive positioning system 162. The signal is compared with a set standard signal which is associated with a normal or preset desired gap and differential signal is generated. This differential signal is then input to operate servomotor 136 and thereby control or maintain the set magnitude of the first gap 102.

The second component of movement associated with the axis $A_1$—$A_1$ is a programmed component. Importantly, the program includes the capability of altering or changing to accommodate actual changes occurring in the $A_2$—$A_2$ axis due to movement of platform 128. Thus, movement of platform 134 is preprogrammed to accommodate, for example, anticipated wear associated with the electrode 22 as well as the particular roll form pattern which is desired. Typically for the $A_1$—$A_1$ direction, then, a programmed control signal is provided from a programmed control network 166 to servomotor 148. This, in turn, drives the second platform 134 to a position which will accommodate tool wear and follow a preselected electrode cutting program. Note that this same programmed control network 166 provides control signals to control movement in the B—B and C—C directions. In the C—C direction, the motor 87 is controlled. In the B—B direction, the motor 156 is controlled.

As an additional feature of the program associated with the network 166, the program may be altered or changed to accommodate changes in various conditions that are sensed by external sensors. For example, as the motor 136 is operated in response to the system which controls the magnitude of gap 102, a resolver associated with motor 136 provides an output signal proportional to the magnitude of movement in the $A_2$—$A_2$ direction. This signal is then inputed into the programmed control network 166 so that the machining program then can be altered to the extent necessary to accommodate the effect of movement of electrode 22 in the $A_2$—$A_2$ direction.

An example of the operation of this control arrangement will assist in its understanding. Assume that a desired depth of metal removal will be 0.005 inches at a fixed point. Further assume that the wear rate associated with the electrode 22 is about 20% or 1/5 that of the workpiece metal removal rate by volume. It is then possible to program the control network 166 and thus control the $A_1$—$A_1$ direction servomotor 148 in accordance with these assumptions. The movement of the platform 134 is thus programmed to provide for movement of that platform at a rate slightly greater (i.e., about 20% greater) than the metal removal rate associated with the electrode machining operation. This accommodates for electrode wear as the machining operation progresses. Simultaneously as the platform 134 is moving in the $A_1$—$A_1$ direction, the platform 128 may incidentally move in response to the sensors 160 associated with control of the magnitude of the first gap 102. For example, if the electrode 22 wears or erodes at only a 15% rate rather than 20% rate, then the programmed control network 166 will cause the first gap 102 to decrease in magnitude below its preset magnitude. To maintain the magnitude of the gap 102 at the assumed and desired constant, the gap voltage sensor 160 and associated control mechanism 162 will sense the undesired decrease and effect movement of platform 128 in the $A_2$—$A_2$ direction. The electrode 22 will be effectively "backed off" from surface 16. Another event which may require the electrode 22 to "back off" from surface 16 is a slower machining rate (i.e. slower effective cutting rate) than the rate programmed. To accommodate such changes in the $A_2$—$A_2$ direction, the program for network 166 will require alteration.

The magnitude of movement of platform 128 is thus sensed by a resolver associated with the servometer 136. This resolver signal is input into the programmed control network and the program for the network accommodates the actual change in movement of platform 128 (i.e. the movement of the surface of electrode 22). Specific circuitry and programs for combining the aforementioned signals, sensing of those signals and providing a programmed control network of the type described are within the skill of the control art once the control arrangement of the present invention is appreciated.

FIGS. 10 and 11 depict a workpiece or roll support mechanism which provides a means for supporting the roll 14 so that it may be easily rotated. Referring to FIGS. 10 and 11, the workpiece 14 has bearing support surfaces or journals 104 and 106 at its opposite ends. The journals 104 and 106 associated with the roll 14 constitute the journals used for the machining and texturing of roll 14. Stubs or axles 108 and 110 project from the journals 104 and 106, respectively. The stubs or axles 108 and 110 are used to support the roll 14 during normal production operation to produce product.

The improvement relates to the first and second work support stations 114 and 116 respectively which are positioned on a table or platform 118 in longitudinally spaced relation for cooperation and support of the roll 14 by cooperation with surfaces 104 and 106 respectively. Stations 114 and 116 are substantially identical. Thus the general description relating to support or station 116 will apply to support 114.

Support 116 includes a first "U" shaped bracket 166 pivotally mounted via a pivot pin 167 in a slot 169 on a bracket support platform 168. The first bracket 166 has vertical, spaced side members 166A and 166B connected by a lower, transverse plate 166C. A journaled roller 170 is positioned between side members 166A, 166B to support the bearing surface 106 of the roll 14. The support 116 also includes a second "U" shaped bracket 172 having vertical, spaced side members 172A, 172B connected by a lower transverse plate 172C. Bracket 172, more particularly plate 172C, is pivotally mounted via pin 171 on a platform 168 in the same manner as first bracket 166. The bracket 172 also includes a roller 176 journaled in the side members 172A, 172B of bracket 172 and positioned against the bearing surface 106 for support of the roll 14. The diameter of roller 170 is approximately one-third of the diameter of roller 176.

The brackets 172 and 166 are each slidably as well as pivotally mounted in a longitudinal slot 169 in platform 168 so that they may be moved toward or away from one another along slot 169 and retained in a fixed spaced relationship by means of a threaded bolt 180 which fits through threaded openings in brackets 166, 172 and controls the spacing thereof. Thus, the distance between the rotation axis of roller 170 in bracket 166 and roller 176 in bracket 172 may be varied in accordance with the adjustment of the bolt 180.

Finally, the support platform 168 for the brackets 166 and 172 is, in turn, pivotally mounted by a pivot mechanism 184 on a plate 186 attached to platform 118. Each of the stations 114 and 116 is fabricated in substantially the same fashion and is attached to the platform 118. Since the brackets 166, 172 are independently freely pivotal and collectively pivotal, they may pivot to accommodate any eccentricities or misalignment of the roll 14 or the surfaces 104, 106. Thus, the roll 14 will be smoothly rotated during machining and will not vibrate.

The support station 114 also includes an axial extension or drive rod 190 associated with roller 176. The drive rod 190 is rotated by a belt 192 driven by a motor 194 mounted on platform 118 to effect appropriate driving of associated roller 176 and thus rotational movement of the roll 14. Because of the pivotal adjustments independently and collectively available for the brackets 166 and 172 and further because of the capability of adjustment of spacing between brackets 166 and 172 due to the operation of the bolt 180, it is possible to accommodate rolls 14 of varying size having variously sized journals. Additionally, if the roll 14 is not precisely accurate in its journal construction and alignment, it is possible to accommodate the roll 14 on the support stations 114, 116 as described while maintaining ease of rotation of the roll 14. Thus, the support mechanism described provides an improved manner for support of a roll 14 while it is being machined by the electrode 22 as previously described.

While there has been set forth a preferred embodiment of the invention, it is to be understood that the invention is to be limited only by the following claims and their equivalents.

What is claimed is:

1. Improved apparatus for electric discharge machining the surface of an electrically conductive generally cylindrical workpiece wherein said workpiece is mounted for rotation about a longitudinal axis for cooperation with an electrode that moves over the surface and including means for directing a dielectric fluid flow in the gap between the electrode and workpiece, said electrode providing an electric discharge therefrom to the roll form surface to alter the surface condition into a desired form, said apparatus comprising, in combination:

a cylindrical electrode having a rotational axis;
means for mounting the electrode for rotation about the rotational axis, said means for mounting also including means for aligning the rotational axis generally parallel to the workpiece longitudinal axis, so as to maintain the cylindrical electrode surface generally parallel to an increment of the workpiece surface;
gap means for defining a gap between the electrode and the workpiece surface, said gap being located on a line generally perpendicular to the axes and connecting the axes;
means for providing electric current for discharge from the cylindrical electrode;
means for rotating the cylindrical electrode about its axis;
means for moving the cylindrical electrode transversely along the longitudinal axis;
said gap means including sensor means for detecting the magnitude of the gap, and means for adjusting the magnitude of said gap, said means for adjusting including platform means for supporting the electrode and means for moving the platform means in response to the sensor means toward or away from the surface; and
means for supporting the cylindrical workpiece, said means for supporting including a workpiece support station affixed to a workpiece platform, said station including first and second roller bearing members, each member mounted on a bracket, said brackets being pivotally mounted to accommodate the workpiece.

2. The apparatus of claim 1 wherein the platform means for supporting the electrode includes first and second platforms both movable relative to each other toward and away from the workpiece surface, said electode being mounted on the first platform, and said first platform being mounted on the second platform.

3. The apparatus of claim 2 wherein the sensor means controls the position of the first platform and also including programmable means for controlling the position of the second platform.

4. The apparatus of claim 3 wherein the programmable means includes an input associated with movement of the first platform.

5. The apparatus of claim 2 wherein said first platform means includes a pivotal platform for mounting the electrode, a first platform upon which the pivotal platform is mounted and means for pivoting the pivoting platform and mounted electrode relative to the surface.

6. The apparatus of claim 1 wherein the brackets are independently pivotally mounted to permit variation of the orientation of the rotation axis of each roll bearing member.

7. The apparatus of claim 1 including means for adjustably spacing the bearing members relative to each other.

8. The apparatus of claim 1 including a support station pivot mount for attaching the station to a platform and permitting simultaneous pivotal movement of the roller bearing members.

* * * * *